US 9,142,044 B2

(12) United States Patent
Fowler et al.

(10) Patent No.: US 9,142,044 B2
(45) Date of Patent: Sep. 22, 2015

(54) APPARATUS, SYSTEMS AND METHODS FOR LAYOUT OF SCENE GRAPHS USING NODE BOUNDING AREAS

(75) Inventors: Anne Marie Fowler, Los Gatos, CA (US); Richard Allen Blair, Manteca, CA (US); Kevin C. Rushforth, San Jose, CA (US)

(73) Assignee: Oracle International Corporation, Redwood City, CA (US)

(*) Notice: Subject to any disclaimer, the term of this patent is extended or adjusted under 35 U.S.C. 154(b) by 747 days.

(21) Appl. No.: 12/472,184

(22) Filed: May 26, 2009

(65) Prior Publication Data

US 2010/0302249 A1    Dec. 2, 2010

(51) Int. Cl.

| | | |
|---|---|---|
| *G06F 17/00* | (2006.01) | |
| *G06T 1/00* | (2006.01) | |
| *G09G 5/00* | (2006.01) | |
| *G06T 11/20* | (2006.01) | |
| *G06F 3/0481* | (2013.01) | |
| *G06F 3/0482* | (2013.01) | |
| *G06T 17/00* | (2006.01) | |
| *G06T 3/00* | (2006.01) | |

(52) U.S. Cl.
CPC ............ *G06T 11/206* (2013.01); *G06F 3/0481* (2013.01); *G06F 3/0482* (2013.01); *G06T 3/00* (2013.01); *G06T 17/005* (2013.01); *G06F 2203/04806* (2013.01); *G06T 2210/61* (2013.01); *G09G 2340/04* (2013.01); *G09G 2340/0407* (2013.01)

(58) Field of Classification Search
CPC .................... G06F 2203/04806; G06F 3/0481; G06F 3/0482; G06T 17/005; G06T 2210/61; G09G 2340/04; G09G 2340/0407

USPC .......... 345/418–419, 581, 619, 473; 715/517, 715/788, 853; 358/1.18
See application file for complete search history.

(56) References Cited

U.S. PATENT DOCUMENTS

| | | | |
|---|---|---|---|
| 7,703,045 B1 * | 4/2010 | Kawahara et al. ............ 715/853 |
| 2003/0135839 A1 * | 7/2003 | Wu et al. ......................... 716/19 |
| 2005/0140694 A1 * | 6/2005 | Subramanian et al. ........ 345/619 |
| 2006/0143589 A1 * | 6/2006 | Horng et al. ..................... 716/19 |
| 2006/0150092 A1 * | 7/2006 | Atkins .......................... 715/517 |
| 2006/0176403 A1 * | 8/2006 | Gritton et al. ................. 348/581 |
| 2006/0227142 A1 * | 10/2006 | Brown et al. ................. 345/473 |
| 2006/0279566 A1 * | 12/2006 | Atkins et al. .................. 345/418 |
| 2007/0022000 A1 * | 1/2007 | Bodart et al. .................... 705/10 |
| 2007/0162859 A1 * | 7/2007 | Yakowenko et al. ......... 715/733 |
| 2009/0002764 A1 * | 1/2009 | Atkins et al. .................. 358/1.18 |
| 2010/0275152 A1 * | 10/2010 | Atkins et al. .................. 715/788 |

* cited by examiner

*Primary Examiner* — Jin-Cheng Wang
(74) *Attorney, Agent, or Firm* — Polsinelli PC

(57) ABSTRACT

A value is assigned to a layout bound of a first node in a scene graph. The layout bound constitutes a bounding volume for the object corresponding to the node and may be the display properties of the object and a first set of display modifiers for the node but not a second set. A display layout is calculated for a second node in the scene graph based on the value of the layout bound. Then, nodes of the scene graph are rendered to generate a display on a display device according to the calculated display layout. The value of the layout bound may be assignable, creating greater flexibility in controlling layout. Additionally, the value assigned to the layout bound may be changed. In this way, layout of nodes with respect to each other is flexible and visual effects and animations can either be factored into that layout or not.

8 Claims, 5 Drawing Sheets

APPARATUS, SYSTEMS AND METHODS FOR LAYOUT OF SCENE GRAPHS USING NODE BOUNDING AREAS

FIELD OF THE INVENTION

Aspects of this invention relate generally to computer systems, and more specifically to displays.

BACKGROUND

A scene graph is a data structure commonly used by vector-based display applications. The scene graph is typically a collection of nodes in a graph or tree structure. A node typically include display properties for an object associated with the node and one or more sets of display modifiers such that rendering the node includes applying the display modifiers to the display properties to display the object. A node may have children but often only a single parent. A parent node may render its children nodes and may propagate properties or modifiers to its children. Additionally, nodes in a scene graph may be grouped such that an operation applied to a group automatically propagates to its members. In some scene graphs, a node can have a relation to other nodes, perhaps even itself.

When creating rich displays using a scene graph, such as visual interfaces, it is often desirable to support the ability to lay out nodes with respect to each other, as well as define visual effects and animations that are either factored into that layout or are not. Typically, scene graph systems struggle to support both of these concepts. This is further complicated when the displays are dynamic rather than merely static.

SUMMARY

Aspects of the present disclosure provide apparatus, systems and methods for layout of scene graphs for generating displays using node bounding areas. A value is assigned to a layout bound of a first node in a scene graph. The layout bound of the first node may constitute a bounding volume for the object corresponding to the node. A display layout is calculated for a second node in the scene graph based on the value of the layout bound. Then, at least the first node and second node are rendered to generate a display on a display device according to the calculated display layout. Thus, lay out of nodes is based on layout bounds of nodes rather than physical display properties of the objects.

The value of the layout bound may be assignable, creating greater flexibility in controlling layout. In one or more embodiments, the value assigned to the layout bound for the first node may be the display properties of the object corresponding to the node and a first set of display modifiers for the node, but not a second set of display modifiers for the node. In this way, layout of nodes with respect to each other is flexible and visual effects and animations can either be factored into that layout or not.

Additionally, the value assigned to the layout bound may be changed. This provides much greater flexibility in layout than scene graphs systems that lay out nodes with respect to each other based on the physical display properties of the objects corresponding to the nodes.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION

Aspects of the present disclosure provide apparatus, systems and methods for layout of scene graphs for generating displays using node bounding areas. A value is assigned to a layout bound of a first node in a scene graph. A display layout is calculated for a second node in the scene graph based on the value of the layout bound. Then, at least the first node and second node are rendered to generate a display on a display device according to the calculated display layout. Thus, lay out of nodes is based on layout bounds of nodes, which may constitute a bounding volume for the objects corresponding to the nodes, rather than physical display properties of the objects. The value of these layout bounds are assignable, creating greater flexibility in controlling layout. The value assigned to the layout bound for a node may be the display properties of the object corresponding to the node and a first set of display modifiers for the node, but, in one example, not a second set of display modifiers for the node. In this way, layout of nodes with respect to each other is flexible and visual effects and animations can either be factored into that layout or not. Additionally, the value assigned to the layout bound may be changed, providing much greater flexibility in layout than scene graphs systems that lay out nodes with respect to each other based on the physical display properties of the objects corresponding to the nodes.

Typically, scene graphs systems lay out nodes with respect to each other based on the physical display properties of the objects corresponding to the nodes. These conventional scene graph systems are typically unable to support both the ability to lay out nodes with respect to each other and define visual effects and animations that are either factored into that layout or are not.

Figure 1:
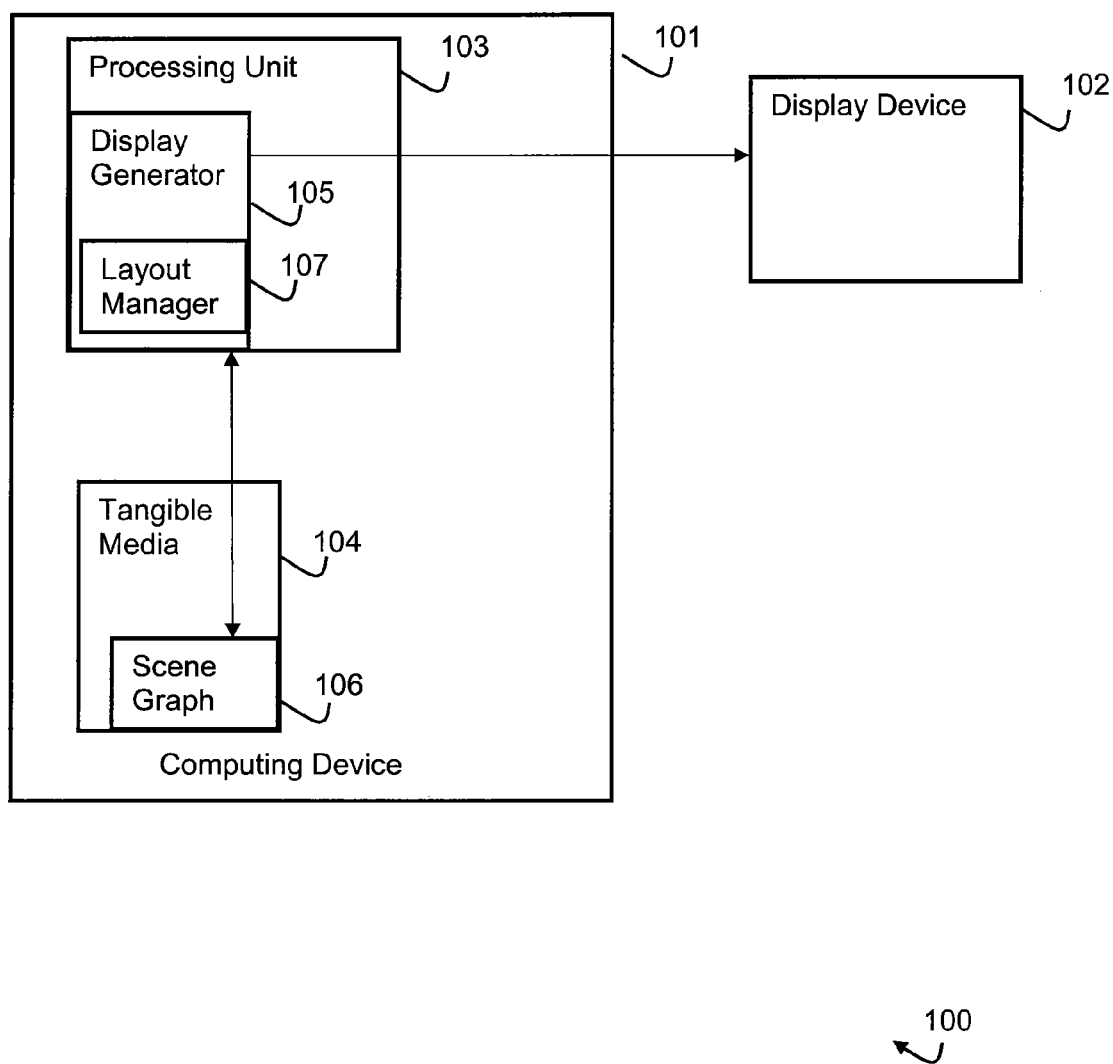
FIG. 1 is a block diagram illustrating a system 100 for layout of scene graphs for generating displays using node bounding areas, in accordance with one or more embodiments of the present disclosure.

FIG. 1 illustrates a system 100 for layout of scene graphs for generating displays using node bounding areas, in accordance with an embodiment of the present disclosure. The system 100 involves a computing device 101 coupled to a display device 102. The computing device 101 includes a processing unit 103, which is operable to execute instructions implementing a display generator 105. The processing unit 103 may constitute a graphics processing unit, a visual processing unit, or a graphics accelerator. The computing device 101 also includes a tangible machine-readable media 104, communicably coupled to the processing unit 103, operable to store a scene graph 106. The tangible machine-readable media 104 may constitute any tangible media capable of storing electronic information, such as a memory or a hard disk drive.

The computing device 101 may include any kind of computing device such as a personal computer, a server computer, a laptop computer, a personal digital assistant, or a cellular telephone. The computing device 101 may also include (not shown) one or more input and/or output devices (including, but not limited to keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth). The display device 102 may include any kind of display device such as a cathode ray-tube display, a liquid crystal display, or a plasma screen display.

It is understood that the system 101 is merely an example, and that the system 101 may include more than one computing device 101, display device 102, processing unit 103, and/or tangible machine-readable media 104 without departing from the scope of the present disclosure. Additionally, though the computing device 101 and the display device 102 are shown as separate devices, it is understood that the computing device 101 and the display device 102 may be integrated into a single device without departing from the scope of the present disclosure. Moreover, although the processing unit 103 and the machine-readable media 104 are illustrated as separate components of the computing device 101, they may be incorporated into a single component of the computing device 101, such as a graphics card, a video card, or a motherboard with on-board video or on-board graphics.

The display generator 105, operating on the processing unit 103, is configured to generate a display on the display device 102 by rendering the scene graph 106 stored in the tangible machine-readable media 104. The display generator 105 may be configured to render the scene graph 106 by rendering one or more nodes included in the scene graph 106. The display may constitute a user interface, such as a graphical user interface. The display may also constitute a vector graphics display.

Figure 2:
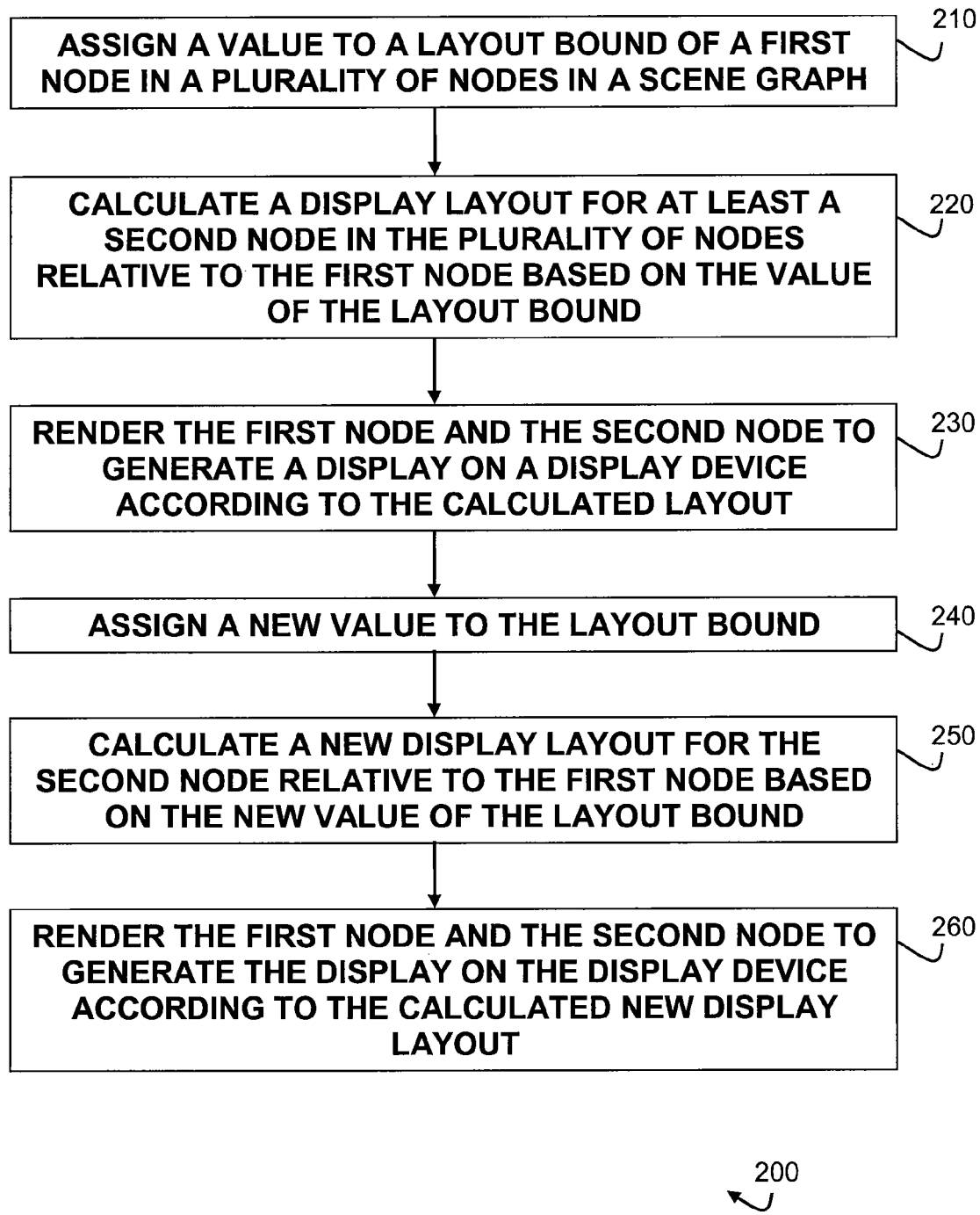
FIG. 2 is a method diagram illustrating a method 200 for layout of scene graphs for generating displays using node bounding areas, which may be performed by the system 100 of FIG. 1, in accordance with one or more embodiments of the present disclosure.

FIG. 2 illustrates a method 200 for layout of scene graphs for generating displays using node bounding areas, which may be performed by the system 100, in accordance with one or more embodiments of the present disclosure. The method 200 may comprise a computer-implemented method, with the method performed by a processing unit, such as the processing unit 103, executing one or more sets of instructions included in a computer program product stored in a machine-readable media, such as the tangible machine-readable media 104.

In a first operation 210, the display generator 105 may assign a value to a layout bound to a first node in a plurality of nodes in the scene graph 106. The first node may include display properties of an object corresponding to the first node and one or more sets of display modifiers. The object may include any kind of object corresponding to the first node, such as a window, a toolbar, a rectangle, a circle, a triangle, and/or a polygon. The display properties of the object may include specifications as to how the object is to be displayed, such as a specified area (i.e., height and width of the object), position, color, opacity, or fill. The one or more sets of display modifiers may include mathematical transformations configured to modify the display properties. For example, the one or more sets of display modifiers may include mathematical transformations to scale, skew, translate, reflect, or shear the specified area of the object. By way of another example, the one or more sets of display modifiers may include mathematical transformations to apply a visual effect or animation to the display properties of the object. The visual effects or animations may include visual effects or animations to apply a pulsating glow to the object, apply a zoom-fade to the object, apply a fade in to the object, apply a fade out to the object, cause the object to wiggle, apply a drop shadow to the object, applying a zoom-out to the object, applying a slide to the object, and etc. Rendering the first node may include applying the one or more sets of display modifiers to the display properties.

The layout bound may constitute a bounding volume for the object corresponding to the first node. A bounding volume for an object is a closed volume that completely contains the object. The layout bound may constitute any kind of bounding volume, such as a bounding sphere, a bounding cylinder, a bounding capsule, a bounding box, a minimum bounding rectangle, a discrete oriented polytope, and/or a convex hull. The layout bound may encompass the specified area of the object.

The one or more sets of display modifiers may include a first set of display modifiers and a second set of display modifiers. The value assigned to the layout bound may include the display properties of the object and the first set of display modifiers but not the second set of display modifiers. Hence, if a display modifier in the first set of display modifiers is altered, the display layout may change because the layout bound has changed. Further, if a display modifier in the second set of display modifiers is altered, the display layout may not change because the layout bound has not changed. Alternatively, the value assigned to the layout bound may include a value or expression other than the display properties of the object and the first set of display modifiers but not the second set of display modifiers.

In a second operation 220, the display generator 105 may calculate a display layout for at least a second node in the plurality of nodes relative to the first node based on the value of the layout bound. The scene graph may include specifications as to render the second node relative to the first node such as a distance and/or position from the first node, at least a distance and/or position from the first node, or within a distance and/or position from the first node. For example, the scene graph 106 may include a specification that the second node be rendered on the display ten pixels to the right and ten pixels above the first node. In this case, the display generator 105 may calculate the display layout to render the second node ten pixels to the right and ten pixels above the layout bound of the first node. The display generator 105 may include a layout manager component 107 and may calculate the display layout utilizing the layout manager 107. The layout manager 107 may read the specifications included in the scene graph as to render the second node relative to the first node and may calculate a display layout for the second node that complies with the specifications.

In a third operation 230, the display generator 105 may render at least the first node and the second node to generate a display on the display device 102 according to the calculated display layout. The display may constitute a user interface, such as a graphical user interface. The display may also constitute a vector graphics display.

In some embodiments, the method 200 may include operations 240-260. In the fourth operation 240, the display generator 105 may assign a new value to the layout bound. If the value assigned to the layout bound was the display properties of the object and the first set of display modifiers but not the second set of display modifiers, the new value assigned to the layout bound may include a value or expression other than the display properties of the object and the first set of display modifiers but not the second set of display modifiers. For example the new value assigned to the layout bound may include the display properties of the object and the second set of display modifiers but not the first set of display modifiers. By way of another example, the new value may include the display properties of the object and the second set of display modifiers and the first set of display modifiers. By way of yet another example, the new value may include the display properties and one or more of the first set of display modifiers and/or one or more of the second set of display modifiers. By way of still another example, the new value may include a constant or one or more of the first set of display modifiers and/or the second set of display modifiers but not the display properties of the object.

In the fifth operation 250, the display generator 105 may calculate a new display layout for the second node relative to the first node based on the new value of the layout bound.

In the sixth operation 260, the display generator 105 may render at least the first node and the second node to generate the display on the display device 102 according to the calculated new display layout.

Figure 3A:
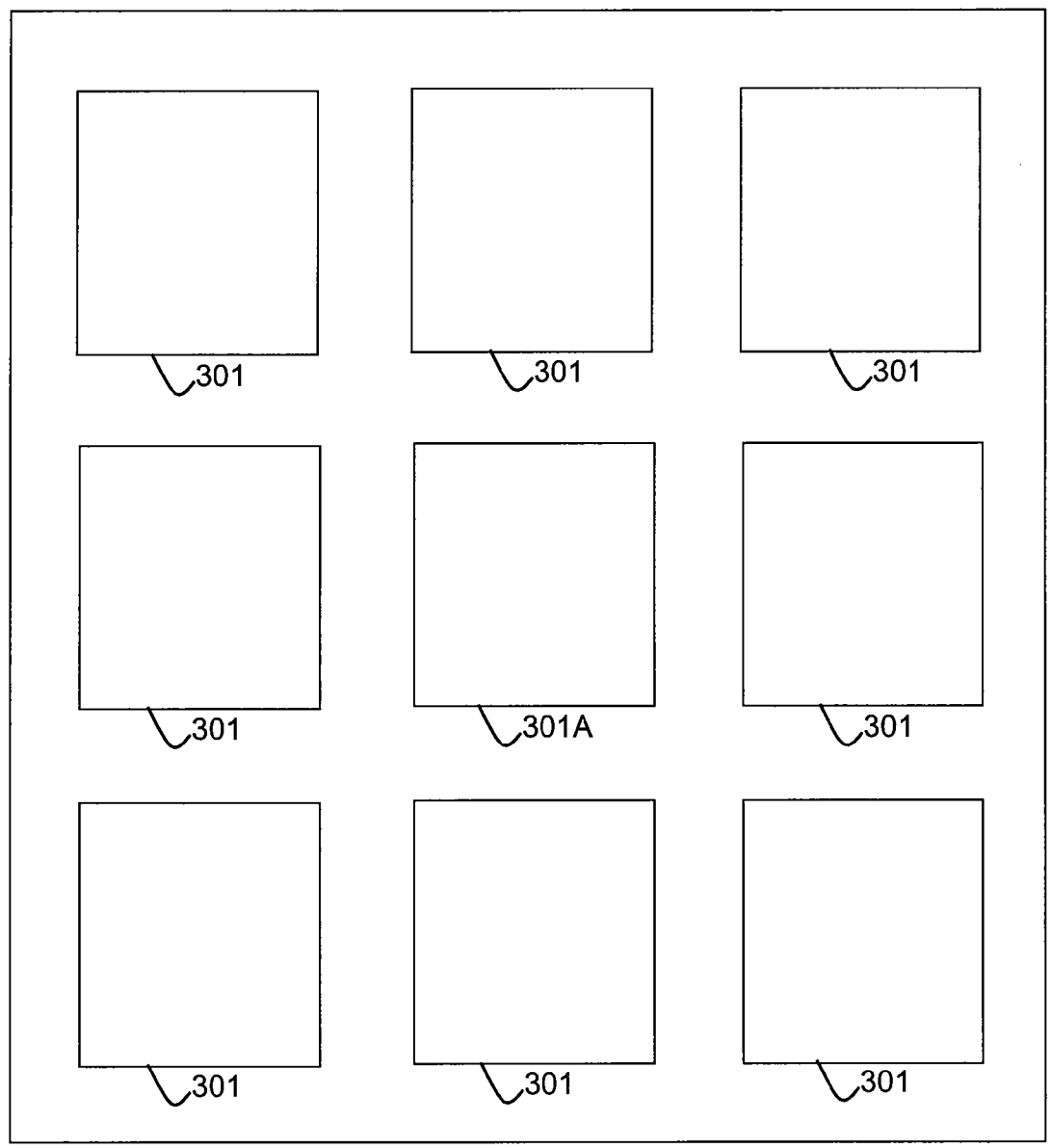
FIG. 3A is a block diagram illustrating the performance of an example implementation of the method of FIG. 2.
Figure 3B:
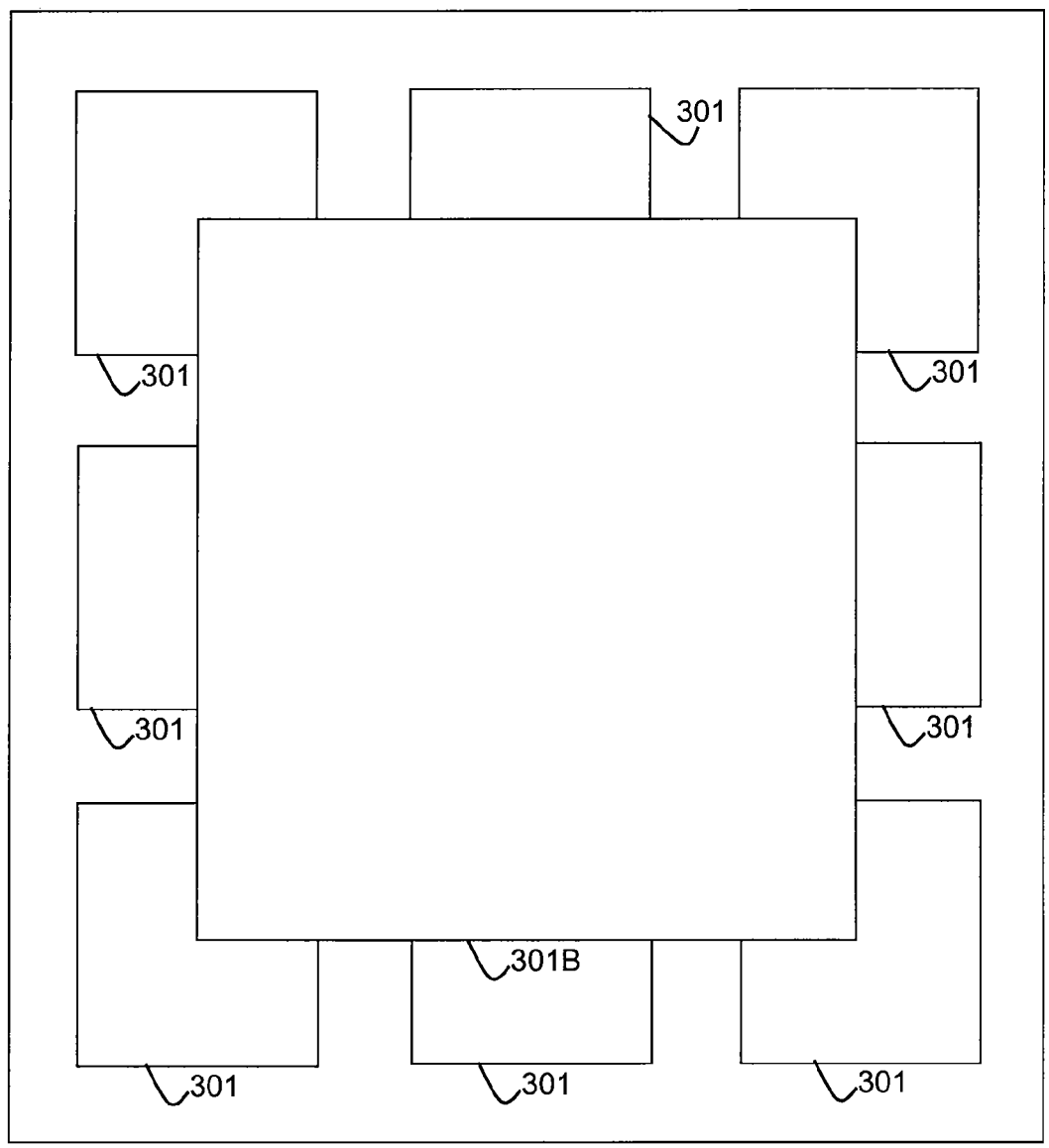
FIG. 3B is a block diagram illustrating the performance of an example implementation of the method of FIG. 2.
Figure 3C:
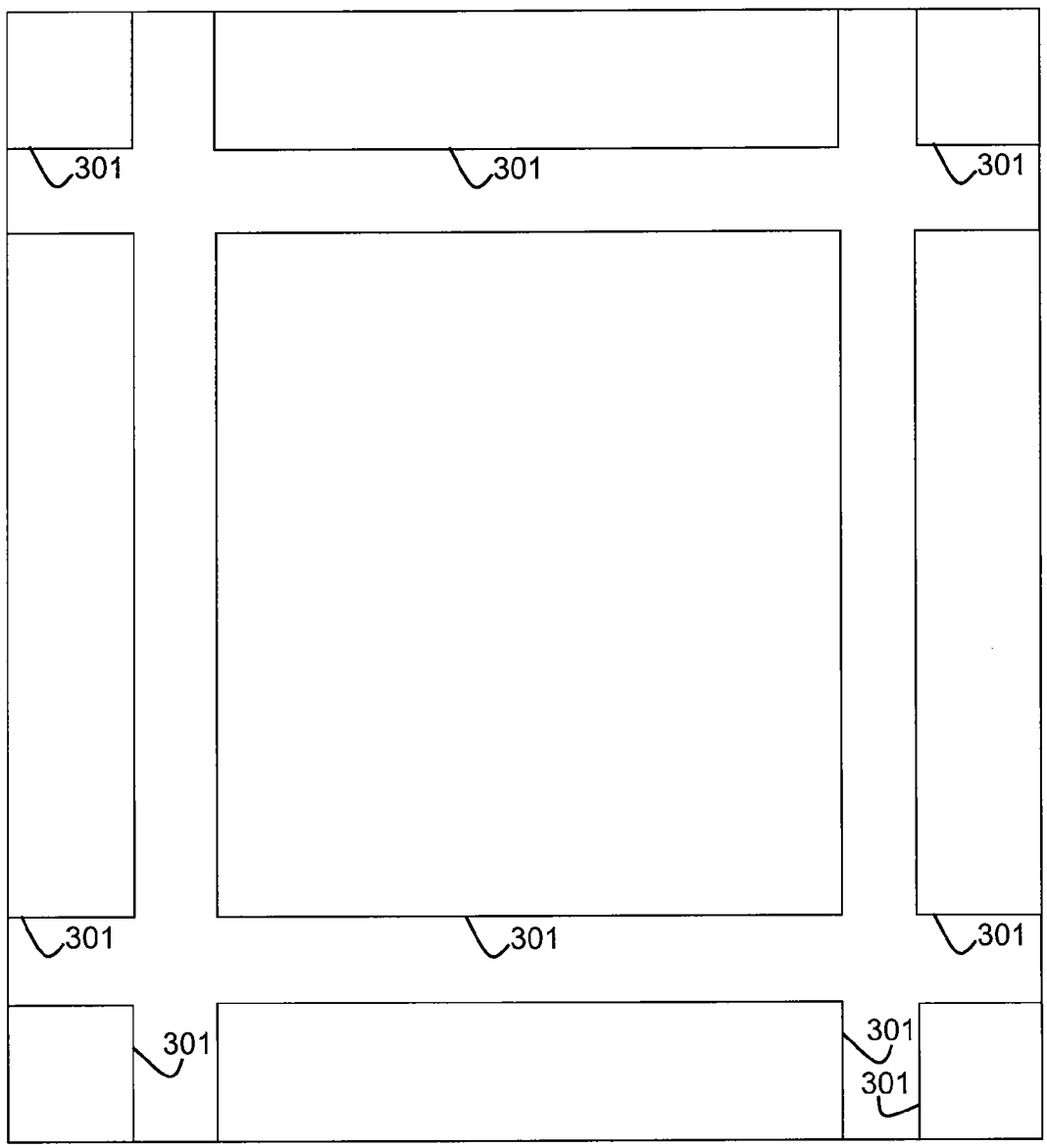
FIG. 3C is a block diagram illustrating the performance of an example implementation of the method of FIG. 2.

By way of example, with reference to FIGS. 3A-3C, performance of an example implementation of method 200 is illustrated. In FIG. 3A, a two-dimensional graphical user interface 300 is illustrated as displayed, having been rendered from a scene graph utilizing the scene graph application programming interface (API) of JavaFX™. The user interface 300 includes a number of picture thumbnails 301, each corresponding to a node in the scene graph. The user interface 300, including the picture thumbnails 301, was generated when the nodes of the scene graph were rendered.

In the scene graph API of JavaFX™, nodes in a scene graph include a local bound variable and a transforms [ ] variable. The local bound variable specifies the area (such as the height, width, and/or position) of the object corresponding to the node. The transforms[ ] variable specifies mathematical transformations that will be applied to modify the object when the node is rendered, such as mathematical transformations to scale, skew, translate, reflect, shear, and/or apply a visual effect or animation to the object. The nodes in the scene graph in the JavaFX™ scene graph API also include other variables (such as scaleX, scaleY, rotate, etc.), which specify mathematical transformations that will be applied to modify the object when the node is rendered. The transforms [ ] variable and the other variables may be utilized to apply the same mathematical transformations to modify the object when the node is rendered. Thus, either the transforms [ ] variable or the other variables may be utilized in a particular instance to apply a mathematical transformation to modify the object when the node is rendered. However, the JavaFX™ scene graph API applies the mathematical transformations specified in the other variables in a pre-determined order, but applies the mathematical transformations specified in the transformations [ ] variable in whatever order they are specified in the node. Thus, mathematical transformations may be specified using the transformations [ ] variable, rather than the other variables, when it is desired to apply mathematical transformations in a particular order contrary to the pre-determined order of the other variables.

In the present example, each of the nodes in the scene graph includes a layoutBounds variable. The layoutBounds variable is assigned a default value of the local bound variable and the transforms [ ] variable, but not the other variables. Also in the present example, the scene graph includes a specification to lay out each of the nodes at least a certain distance away from the surrounding nodes. Thus, the layout is calculated for each of the nodes based on the layoutBounds of the surrounding nodes and the user interface 300 is rendered based on the calculated layout, resulting in the space between the picture thumbnails 301 in the user interface 300.

In this example, when a user selects one of the picture thumbnails 301A, a mathematical scale transformation is set using the scaleX and scaleY variables of the node in the scene graph corresponding to that particular picture thumbnail. As a result, the particular picture thumbnail 301B is scaled larger to illustrate that the particular picture thumbnail 301A has been selected by the user. FIG. 3B illustrates the user interface 300 where a user has selected the center picture thumbnail 301A. As a result, the mathematical scale transformation was set using the scaleX and scaleY variables of the node corresponding to the center picture thumbnail 301A and the center picture thumbnail 301B is rendered as scaled larger. However, the layout of the other picture thumbnails 301 have not changed. This is because the layoutBounds variable does not include mathematical transformations set in the other variables in the nodes, including the scaleX and scaleY variables. Although the present example illustrates the scaled larger center picture thumbnail 301B as blocking view of the other picture thumbnails, in some implementations other mathematical transformations may be applied when the user selected the center picture thumbnail 301 to reduce the opacity of the center picture thumbnail 301 such that the other picture thumbnails 301 are visible behind the scaled larger center picture thumbnail 301 without departing from the scope of the present disclosure.

By way of contrast, when a user utilizes a zoom function of the user interface 300, a mathematical transformation is set in each of the nodes using the transforms [ ] variable of each node. As a result, each of the picture thumbnails 301 is scaled larger to illustrate that the user has zoomed in. FIG. 3C illustrates the user interface 300 where a user has zoomed in. As a result, the mathematical scale transformation was set using the transforms [ ] variable of each node and each of the picture thumbnails 301 is rendered as scaled larger. Further, the layout of the picture thumbnails 301 have changed. This is because the layoutBounds variable for each node includes mathematical transformations set in the transforms [ ] variable of each node.

However, the layoutBounds for each node in the scene graph in this example may be assigned to a value other than the local bound variable and the transforms [ ] variable but not the other variables. The layoutBounds may be set to a constant, in which case the layout of the picture thumbnails 301 would not change regardless what mathematical transformations were set in each of the nodes, whether utilizing the transforms [ ] variable or the other variables. Alternatively, the layoutBounds may be set to the local bound variable and the other variables but not the transforms [ ] variable. In that case, if a user selected a particular picture thumbnail 301 the layout of the other picture thumbnails 301 would change (similar to FIG. 3C) and if the user zoomed in the layout of the other picture thumbnails 301 would not change (similar to FIG. 3B).

It is understood that the above example is merely exemplary. The display may be a display other than a two-dimensional graphical user interface, or the user interface may include objects other than picture thumbnails without departing from the scope of the present disclosure. Additionally, though the above example refers to specific technologies such as JavaFX™, it is understood that other technologies could be utilized without departing from the scope of the present disclosure.

The present disclosure may provide apparatus, systems and methods for layout of scene graphs for generating displays using node bounding areas. These various features enable layout of nodes in scene graphs with respect to each other that is flexible and allows visual effects and animations to either be factored into that layout or not.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A computer-implemented method, comprising:
assigning, using at least one processing device, a first value to a layout bound variable of a layout bound, the layout bound defining a bounding volume for an object, the object corresponding to a first node in a plurality of nodes in a scene graph,
wherein the first node of the scene graph includes:
at least one display property defining at least an area of the object of the first node; and
at least one set of transforms for modifying the at least one display property, the at least one set of transforms comprising a first set of transforms and a second set of transforms,
and wherein the first value assigned to the layout bound variable includes the area of the object and the first set of transforms;
using the at least one processing device, calculating, based on the first value assigned to the layout bound variable, a first display layout for at least a second node in the plurality of nodes, the first display layout defining a first position of the second node relative to the first node when rendered;
first rendering, using the at least one processing device, the first node and the second node by:
applying the first set of transforms of the first value to the area of the object to thereby modify the object; and
generating a first display on a display device according to the calculated first display layout;
assigning, using the at least one processing device, a second value to the layout bound variable, wherein the second value comprises the second set of transforms and is thereby different than the first value;
calculating, using the at least one processing device, a second display layout for the second node relative to the first node based on the second value of the layout bound variable, the second display layout defining a second position of the second node relative to the first node when rendered; and
second rendering, using the at least one processing device, the first node and the second node by:
applying the second set of transforms of the second value to the at least one display property, thereby modifying the object; and
generating a second display on the display device according to the second display layout.

2. The computer-implemented method of claim 1, wherein altering a transform in the first set of transforms changes the first display layout.

3. The computer-implemented method of claim 1, wherein altering a transform in the second set of transforms does not change the first display layout.

4. The computer-implemented method of claim 1, wherein the display device comprises a user interface.

5. A non-transitory computer readable medium encoded with instructions executable by a processor, the instructions comprising:
assigning a first value to a layout bound variable of a layout bound, the layout bound defining a bounding volume for an object, the object corresponding to a first node in a plurality of nodes in a scene graph,
wherein the first node of the scene graph includes:
at least one display property defining at least an area of the object of the first node; and
at least one set of transforms for modifying the at least one display property, the at least one set of transforms comprising a first set of transforms and a second set of transforms,
and wherein the first value assigned to the layout bound variable includes the area of the object and the first set of transforms;

calculating, based on the first value assigned to the layout bound variable, a first display layout for at least a second node in the plurality of nodes, the first display layout defining a first position of the second node relative to the first node when rendered;

first rendering, using the at least one processing device, the first node and the second node by:
applying the first set of transforms of the first value to the area of the object to thereby modify the object during rendering; and
generating a first display on a display device according to the calculated first display layout;

assigning a second value to the layout bound variable, wherein the second value comprises the second set of transforms and is thereby different than the first value;

calculating, using the at least one processing device, a second display layout for the second node relative to the first node based on the second value of the layout bound variable, the second display layout defining a second position of the second node relative to the first node when rendered; and second rendering, using the at least one processing device, the first node and the second node by:
applying the second set of transforms of the second value to the object to thereby modify the object rendering; and
generating a second display on the display device according to the second display layout.

6. The non-transitory computer readable medium of claim 5, wherein altering a transform in the first set of transforms changes the first display layout.

7. The non-transitory computer-implemented method of claim 5, wherein altering a transform in the second set of transforms does not change the first display layout.

8. The non-transitory computer readable medium of claim 5, wherein the display device comprises a user interface.

* * * * *